United States Patent [19]

Figiel

[11] 4,045,365

[45] Aug. 30, 1977

[54] AZEOTROPE-LIKE COMPOSITIONS OF TRICHLORO-TRIFLUOROETHANE, ACETONITRILE AND ACETONE

[75] Inventor: Francis J. Figiel, Boonton, N.J.

[73] Assignee: Allied Chemical Corporation, Morris Township, N.J.

[21] Appl. No.: 741,633

[22] Filed: Nov. 16, 1976

Related U.S. Application Data

[63] Continuation-in-part of Ser. No. 686,208, May 13, 1976, abandoned.

[51] Int. Cl.$^2$ .................... C11D 7/50; C11D 7/32; C11D 7/30
[52] U.S. Cl. .................................. 252/141; 252/67; 252/78.1; 252/171; 252/364; 252/DIG. 9; 134/38; 134/40
[58] Field of Search ............... 252/161, 171, 364, 141, 252/DIG. 9, 78.1, 67; 134/38, 40

[56] References Cited

U.S. PATENT DOCUMENTS

| 2,999,815 | 9/1961 | Eiseman .................... 252/DIG. 9 X |
| 3,553,142 | 1/1971 | Figiel et al. .................... 252/141 |
| 3,728,268 | 4/1973 | Burt ................... 252/171 X |
| 3,789,004 | 1/1974 | McMillan et al. ......... 252/DIG. 9 X |

*Primary Examiner*—Harris A. Pitlick
*Attorney, Agent, or Firm*—Jay P. Friedenson; Alan M. Doernberg

[57] ABSTRACT

Azeotrope-like compositions consisting essentially of 1,1,2-trichloro-1,2,2-trifluoroethane, acetonitrile and acetone have utility as degreasing agents and as solvents to remove rosin fluxes from printed circuit boards.

4 Claims, No Drawings

AZEOTROPE-LIKE COMPOSITIONS OF TRICHLORO-TRIFLUOROETHANE, ACETONITRILE AND ACETONE

RELATED APPLICATIONS

This is a continuation-in-part application of co-pending application Ser. No. 686,208, filed May 13, 1976 now abandoned.

BACKGROUND OF THE INVENTION

Fluorocarbon solvents, such as trichlorotrifluoroethane, are widely used as degreasing agents due to their excellent solvent power for greases and some emulsion-type lubricants. Trichlorotrifluoroethane also finds wide use in removing solder fluxes from printed circuit boards due to its selective solvency and non-flammability. Since trichlorotrifluoroethane is non-polar, however, it does not remove polar contaminates. Thus, to overcome this inability, trichlorotrifluoroethane has, in the past, been mixed with polar components, such as aliphatic alcohols.

The art has looked towards azeotropic compositions including desired fluorocarbon components, such as trichlorotrifluoroethane, which include the desired polar components, and other components which contribute desired characteristics, such as stabilizers. Azeotropic compositions are desired because they exhibit a minimum boiling point and do not fractionate upon boiling. This is desirable because in vapor degreasing equipment, in which these solvents are employed, redistilled material is generated for final rinse-cleaning. Thus, the vapor degreasing system acts as a still. Unless the solvent composition exhibits a constant boiling point, i.e. is an azeotrope or is azeotrope-like, fractionation will occur and undesirable solvent distribution may act to upset the cleaning and safety of processing. This is also important in the use of the solvent compositions to remove solder fluxes from printed circuit boards. Preferential evaporation of the more volatile components of the solvent mixtures, which would be the case if they were not azeotropic or azeotropic-like, would result in mixtures with changed compositions which may have less desirable properties, such as lower solvency for rosin fluxes, less inertness toward the electrical components and increased flammability.

A number of trichlorotrifluoroethane based azeotropic compositions have been discovered which have been tested and in some cases employed as solvents for miscellaneous vapor degreasing applications and for the removal of solder fluxes from printed circuit boards. For example, U.S. Pat. No. 2,999,815 discloses the binary azeotrope of 1,1,2-trichloro-1,2,2-trifluoroethane with acetone; U.S. Pat. No. 3,553,142 discloses the binary azeotrope of 1,1,2-trichloro-1,2,2-trifluoroethane with acetonitrile; U.S. Pat. No. 3,903,009 discloses the ternary azeotrope of 1,1,2-trichloro-1,2,2-trifluoroethane with nitromethane and ethanol; U.S. Pat. No. 3,573,213 discloses the binary azeotrope of 1,1,2-trichloro-1,2,2-trifluoroethane with nitromethane; U.S. Pat. No. 3,789,006 discloses the ternary azeotrope of 1,1,2-trichloro-1,2,2-trifluoroethane with nitromethane and isopropanol; and U.S. Pat. No. 3,728,268 discloses the ternary azeotrope of 1,1,2-trichloro-1,2,2-trifluoroethane with acetone and ethanol.

Unfortunately, as it is recognized in the art, it is not possible to predict the formation of azeotropes and this obviously complicates the search for new azeotropic systems which have application in this field. Nevertheless, there is a constant effort in the art to discover new azeotropic or azeotropic-like systems which have desirable solvency characteristics and particularly a greater versatility of solvency power.

It is accordingly an object of this invention to provide novel azeotropic or azeotropic-like compositions based on 1,1,2-trichloro-1,2,2-trifluoroethane which have good solvency power and other desirable properties for vapor degreasing applications and for the removal of solder fluxes from printed circuit boards.

Other objects and advantages of the invention will be apparent from the following description.

DESCRIPTION OF THE INVENTION

In accordance with the invention, novel azeotrope-like compositions have been discovered which consist essentially of about 90.62 weight percent of 1,1,2-trichloro-1,2,2-trifluoroethane, about 1.91 weight percent of acetonitrile and about 7.47 weight percent of acetone. Such compositions have a minimum boiling point at 766.4 mm Hg of about 44.5° C.

It has been found that these azeotrope-like compositions are stable, non-flammable, inert to electronic components of printed circuit boards and exhibit excellent solvency power which makes such compositions particularly effective in vapor degreasing applications and for the removal of solder fluxes from printed circuit boards.

For the purpose of this discussion, by azeotrope-like composition is intended to mean that the composition behaves like a true azeotrope in terms of its constant boiling characteristics or tendency not to fractionate upon boiling or evaporation. Such composition may or may not be a true azeotrope. Thus in such compositions, the composition of the vapor formed during boiling or evaporation is identical or substantially identical to the original liquid composition. Hence during boiling or evaporation, the liquid composition, if it changes at all, changes only to a minimal or negligible extent. This is to be contrasted to non-azeotropic or non-azeotrope-like compositions in which during boiling or evaporation, the liquid composition changes to a substantial degree.

As is well known in this art, another characteristic of azeotrope-like compositions is that there is a range of compositions containing the same components in varying proportions which are azeotrope-like. All such compositions are intended to be covered by the term azeotrope-like as used herein.

The 1,1,2-trichloro-1,2,2-trifluoroethane, acetonitrile and acetone components of the novel solvent compositions of the invention are commercially available. Preferably they should be used in sufficiently high purity so as to avoid the introduction of adverse influences upon the solvency properties or constant boiling properties of the system. A suitable grade of 1,1,2-trichloro-1,2,2-trifluoroethane, for example, is sold by Allied Chemical Corporation under the trade name "Genesolv" D.

The novel azeotrope-like compositions of the invention may be purified and reclaimed for use after saturation with dissolved materials by simple flash distillation.

The novel azeotrope-like compositions of this invention may be used to clean a variety of materials such as synthetic organic polymers, plastics, resins, resin laminates, resin-bonded paperboard, bakelite, fiberglass and like materials. The novel solvents of the invention are particularly well suited for the removal of rosin-based fluxes which are used in the preparation of printed circuit boards. Vapor degreasers are generally used to apply the solvent to the boards. In a conventional operation of a vapor degreaser, the board is passed into a sump of boiling solvent, which removes the bulk of the resin, and thereafter through a sump containing freshly distilled solvent near room temperature, and finally through solvent vapors over the boiling sump which provides a final rinse with clean pure solvent which condenses on the circuit board. In addition, the board can also be sprayed with distilled solvent before final rinsing.

From the above description it can be appreciated that a preferred process embodiment of the invention involves cleaning a solid surface comprising contacting said surface with a novel azeotrope-like composition in accordance with this invention.

A still preferred process embodiment of the invention involves so cleaning a solid surface which is a printed circuit board contaminated with solder flux.

The novel solvent mixtures of the invention find other applications such as for removing gases and oils from a variety of industrial items, for the cleaning of photographic films and prints, for the removal of buffing compounds such as rouge, for the extraction of high quality natural and synthetic products such as vitamins, enzymes, hormones, spices, and essential oils, as heat exchange media, as electrical transfer media, as chemical reaction media and as hydraulic fluids.

It will be apparent to those skilled in the art that for specialized purposes, various additives could be incorporated with the novel solvent mixtures of the invention, for example, lubricants, detergents and the like. These additives are chosen so as not to adversely affect the essential properties of the mixtures for a given application.

EXAMPLE 1

A distillation flask was charged with about 4,485 grams of 1,1,2-trichloro-1,2,2-trifluoroethane, about 400 grams of acetone and about 115 grams of acetonitrile and the resulting mixture was heated. The barometric pressure was measured at 766.4mm Hg. A constant boiling fraction at 44.5° C. was collected and found to contain all three components. Hence this fraction was determined to be azeotrope-like. Analysis by gas chromatography determined that the weight percentages of the components of this constant boiling fraction were:

| | |
|---|---|
| 1,1,2-trichloro-1,2,2-trifluoroethane | 90.62 wt.% |
| acetonitrile | 1.91 wt.% |
| acetone | 7.47 wt.% |

The boiling point of this constant boiling mixture at 766.4mm Hg is 44.5° C. This corresponds to a boiling point of 760mm Hg of 45.0° C.

This azeotrope-like composition was tested for flammability by the open cup flash point test (ASTM D1310-63) and was classified as non-flammable.

EXAMPLE 2

A standard measure of solvency for certain classes of solvents is the Kauri-Butanol value. This test (ASTM 1163-61) was made on the preferred azeotrope-like composition in accordance with this invention. The established value is then compared with those of some related binary azeotropic systems and other common solvents. The results are given in Table I.

TABLE I

| Solvents | K-B Value* |
|---|---|
| 1. 1,1,2-trichloro-1,2,2-trifluoroethane | 32 |
| 2. acetonitrile | 16 |
| 3. acetone | 86 |
| 4. binary azeotrope of 1,1,2-trichloro-1,2,2-trifluoroethane (95.0 wt.%), acetonitrile (5.0 wt.%) | 42 |
| 5. binary azeotrope of 1,1,2-trichloro-1,2,2-trifluoroethane (87.5 wt.%), acetone (12.5 wt.%) | 58 |
| 6. azeotrope-like composition of Example 1, 1,1,2-trichloro-1,2,2-trifluoroethane (90.62 wt.%), acetonitrile (1.91 wt.%), acetone (7.47 wt.%) | 47 |

*These values may vary from analyst to analyst because of the nature of the test.

The above data show that the K-B value for the azeotrope-like composition of the invention (Solvent No. 6) is substantially higher than that of the 1,1,2-trichloro-1,2,2-trifluoroethane (Solvent No. 1) or acetonitrile (Solvent No. 2) components alone, and higher than that of the binary azeotrope of Solvent No. 4. Although the K-B value of the novel azeotrope-like composition is lower than that of acetone (Solvent No. 3) and the acetone containing binary azeotrope (Solvent No. 5), the azeotrope-like composition of the invention is more inert towards the electronic components of printed circuit boards than is the said binary azeotrope in which acetone is present in a higher concentration, and thus combines the desirable properties of high solvency power with inertness towards circuit board components.

EXAMPLE 3

To further indicate the solvency power of the azeotrope-like compositions of the invention, the following test was conducted. A few drops of Alpha Milros Flux 611 (Mil 14256 Type A), a product of Alpha Metals Inc., was placed on copper clad printed circuit boards, then baked for 1 minute at 550° F. over a hot plate. The boards were immersed in room temperature solvents and timed until the flux residue dissolved under constant stirring. The test was repeated for all solvents tested. The results are given in Table II.

TABLE II

| Solvent | Condition | Remarks |
|---|---|---|
| 1. 1,1,2-trichloro-1,2,2-trifluoroethane | 3 minutes | not dissolved |
| 2. binary azeotrope of 1,1,2-trichloro-1,2,2-trifluoroethane (95.0 wt.%), acetonitrile (5.0 wt.%) | 15 seconds | no residue |
| 3. binary azeotrope of 1,1,2-trichloro-1,2,2-trifluoroethane (87.5 wt.%), acetone (12.5 wt.%) | 15 seconds | no residue |
| 4. azeotropic-like composition of Example 1, 1,1,2-trichloro-1,2,2-trifluoroethane (90.62 wt.%), acetonitrile (1.91 wt.%), acetone (7.47 wt.%) | 10 seconds | no residue |

The above data indicate the excellent solvency power of the azeotropic-like compositions of the invention for a typical solder flux used on printed circuit boards.

We claim:

1. Azeotrope-like compositions comprising about 90.62 weight percent 1,1,2-trichloro-1,2,2-trifluoroethane, about 1.91 weight percent acetonitrile and about 7.47 weight percent acetone.

2. Azetrope-like compositions which consist essentially of the compositions defined in claim 1.

3. The method of cleaning a solid surface which comprises treating said surface with an azeotrope-like composition as defined in claim 2.

4. The method of cleaning a solid surface as described in claim 3 in which the solid surface is a printed circuit board contaminated with solder flux.

* * * * *